US009081464B2

(12) United States Patent
Sorrick (10) Patent No.: US 9,081,464 B2
(45) Date of Patent: Jul. 14, 2015

(54) OBJECT SELECTION

(75) Inventor: Paul H. Sorrick, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 262 days.

(21) Appl. No.: 12/623,147

(22) Filed: Nov. 20, 2009

(65) Prior Publication Data

US 2014/0033124 A1    Jan. 30, 2014

(51) Int. Cl.
*G06F 3/048* (2013.01)
*G06F 3/0481* (2013.01)
*G06F 3/01* (2006.01)
*G06F 3/0482* (2013.01)

(52) U.S. Cl.
CPC .............. *G06F 3/048* (2013.01); *G06F 3/0481* (2013.01); *G06F 3/017* (2013.01); *G06F 3/0482* (2013.01)

(58) Field of Classification Search
CPC ..... G06F 3/0416; G06F 3/044; G06F 3/0482; G06F 3/017; G06F 3/0481; G06F 3/04883; G06F 3/0485; G06F 19/28
See application file for complete search history.

(56) References Cited

U.S. PATENT DOCUMENTS 5,548,703 A * 8/1996 Berry et al. .................... 715/853
6,396,522 B1 * 5/2002 Vu ................................. 715/848
2005/0183017 A1 * 8/2005 Cain ............................... 715/719
2006/0174209 A1 * 8/2006 Barros .......................... 715/764
2010/0214465 A1 * 8/2010 Suzuki et al. ............ 348/333.02

OTHER PUBLICATIONS

Kvern, O. M., Blatner, D., "Real World Adobe InDesign CS", May 2004, Peachpit Press, Ch. 2, Section "Grouping Objects" and "Selecting and Deselecting".*
Walker, M., "Microsoft Office Visio 2007 Inside Out", May 2007, Microsoft Press, Ch. 22, Section "Working with Groups".*
Ambrosius, L., "AutoCAD 2009 & AutoCAD 2009 All-in-One Desk Reference for Dummies", May 2008, For Dummies, Ch. 2, Section "Selecting Objects".*
Blatner, D., Smith, C., Werner, S., "Moving to InDesign", Sep. 2004, Peachpit Press, Ch. 11, Section "Grouping".*

* cited by examiner

*Primary Examiner* — Claudia Dragoescu
(74) *Attorney, Agent, or Firm* — Shook, Hardy & Bacon L.L.P.

(57) ABSTRACT

In an example embodiment, a system and method is illustrated that includes receiving a first cursor actuation signal from a cursor controlling device where the first cursor actuation signal received at a first cursor position in a graphical user interface. Further, the system and method includes determining an old hierarchy level, determining a new hierarchy level based on the first cursor position and the old hierarchy level, and selecting a target object based on the new hierarchy level and the first cursor position.

13 Claims, 10 Drawing Sheets

OBJECT SELECTION

TECHNICAL FIELD

The present application relates generally to the technical field of rendering images on a display and, in one specific example, the manipulation of images.

BACKGROUND

Cursors are used to indicate a position. For example a mouse cursor may be used to indicate a position that may respond to input from the mouse. A text cursor may indicate a position that may respond to input from a keyboard. A cursor on a display screen can be used to input commands into a computer. The cursor has an associated location on a screen, and a user can use a cursor controlling device to change this location on the screen and input commands.

A page layout generally includes multiple objects. These objects may include texts, images, other objects, or a combination of the above. Objects may be grouped into object groups and operated on as a unit. In some instances, a user may wish to operate on an object within an object group. To do so, the user may need to isolate from the object group and select the object.

BRIEF DESCRIPTION OF THE DRAWINGS

Some embodiments are illustrated by way of example and not limitation in the figures of the accompanying drawings in which.

DETAILED DESCRIPTION

In various example embodiments, methods and systems to select an object in a graphical user interface, such as a page layout, are disclosed. In the following description, for purposes of explanation, numerous specific details are set forth in order to provide a thorough understanding of an example embodiment of the present invention. It may be evident, however, to one skilled in the art that the present invention will be practiced without these specific details.

In various example embodiments, systems and methods are shown that allow a user to select an object in an object hierarchy of a layout. The object hierarchy may comprise one or more objects where each object is associated with a level in the object hierarchy. The user may select the object in the object hierarchy by moving a cursor to a position of an object to be selected and initiating a cursor actuation signal such as a double-click. However, more than one object of the object hierarchy may be positioned at the cursor position where the user initiated the cursor actuation signal. For example a group object may have one or more member objects within it and the group object and one or more member objects may be positioned at the cursor position. In one embodiment, an initial object, at an initial level of the object hierarchy, may be selected in response to receiving the cursor actuation signal. If the initially selected object is not the object desired by the user, the user can initiate another cursor actuation signal at the same location and an object at the same position and at a higher level of the object hierarchy may be selected. This process of selecting objects at higher and higher levels of the object hierarchy in response to cursor actuation signals may be repeated until a user's desired object is selected. In other embodiments, instead of going up the object hierarchy (selecting objects with higher and higher levels), objects of lower levels of the object hierarchy may be selected. In some embodiments, a combination of going up and going down the object hierarchy may be implemented.

A page layout or page may be any representation of a graphical element composed of one or more other graphical elements. For example, a page or page layout may comprise one or more graphical elements or object that are positions in certain areas of the page. A page layout may include various objects (sometimes referred to as "page objects" or "page items"). Objects may be any selectable item in a page layout or page. As a result, objects may also be operated on as a unit (e.g., cut and pasted, copied, moved, rotated, scaled, resized, color adjusted, etc.) For example, objects may include frames, images/graphics, text frames, texts, custom objects, etc. A page layout may be created using a design application or page layout software such as the Adobe® InDesign® from Adobe Systems Incorporated of San Jose, Calif. The design application may execute instructions to include a tool palette. The tool palette may include multiple types of tools including, for example, spray paint tool, select tool, shape tool, text box tool, erase tool, etc. Although some embodiments discuss object hierarchies in page layouts, object hierarchies in other formats may also be similarly implemented. For example, object hierarchies in web pages, graphical images, screens, or other layouts in graphical user interfaces may be similarly implemented.

A frame is a basic container object in a page layout which may or may not contain content. When a frame contains an image item, the frame is sometimes called an "image frame" or a "graphic frame." When a frame contains text, the frame is sometimes called a "text frame." A frame object may also contain one or more objects.

A group object (sometimes referred to as a "group" or "object group") is an object that is an association of more than one item that can be selectable as a unit. The group object may also be operated on as a unit. In some embodiments a group object may be an association of one or more objects as well as one or more other group objects. In these circumstances, the one or more group objects within a group object may be referred to as "member object," "sub-group objects," or "sub-groups."

Objects in an object hierarchy may also be described in terms of a tree. For example, a group object may contain other objects or members, the members contained in the group object are may be referred to as the group object's children or child object. The group object may also be within another object, as a result, this object is called the group object's parent object.

A cursor is any indicator used to show a position on an interface (e.g., shown on a computer monitor or other display device) and is responsive to input from a cursor controlling device (e.g., text input device or pointing device).

Figure 1:
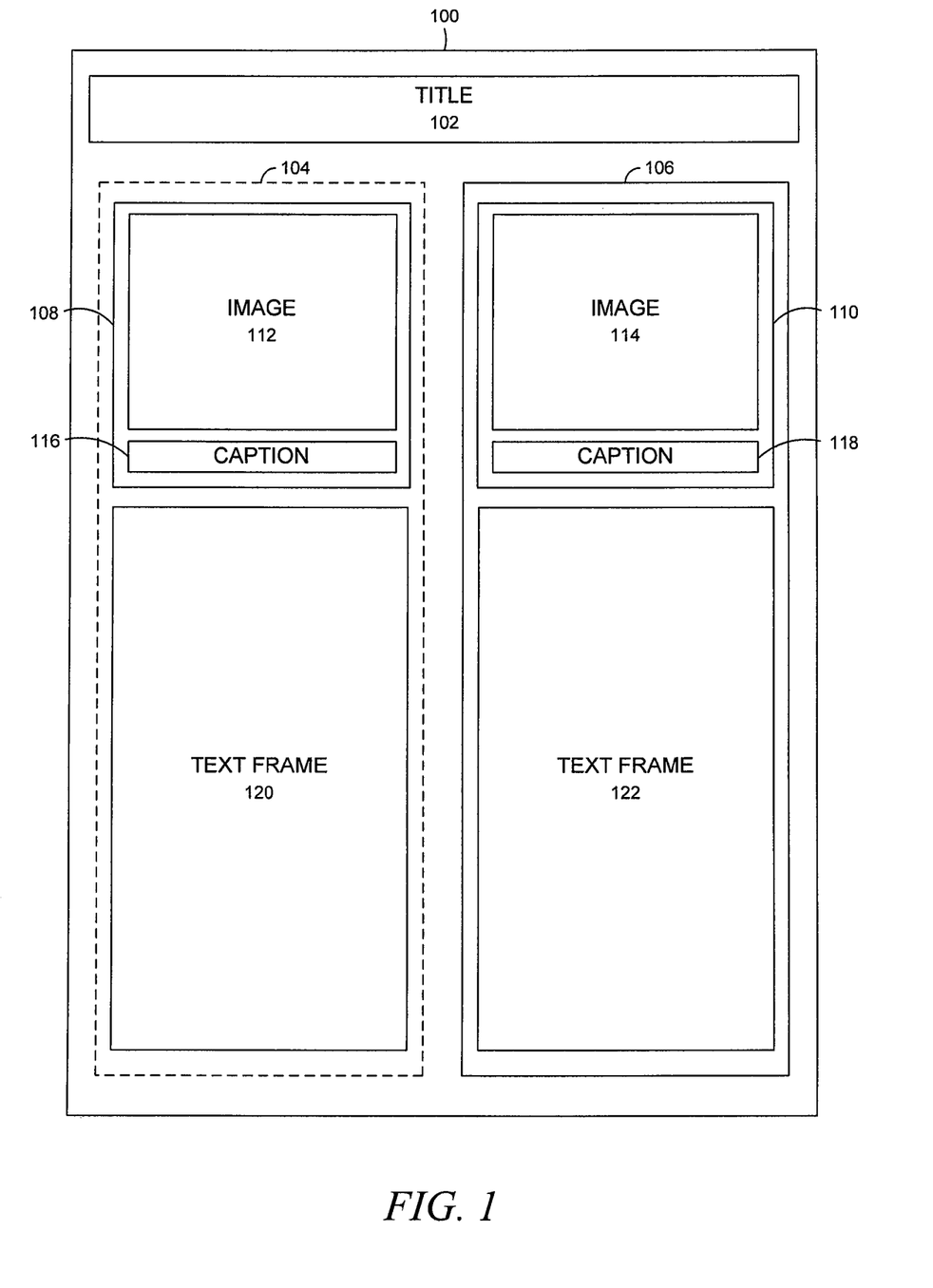
FIG. 1 is a block diagram illustrating a user interface displaying an example page layout, according to various embodiments.

FIG. 1 is a block diagram illustrating a user interface displaying an example page layout, according to various embodiments. In FIG. 1, page layout 100 contains a number of objects. For example, page layout 100 contains a text frame 102 that represents the title of the particular page layout 100. Page layout 100 also contains group objects 104 and 106. In page layout 100, group object 104 has been shown in dotted lines to illustrate that group object 104 is the currently selected object. Group object 104 is shown containing two members, sub-group object 108 and text frame 120. Sub-group 108 is further shown containing two members of its own, image frame 112 containing an image and text frame 116 representing a caption associated with image frame 112. Similarly, group object 106 is shown containing two members, sub-group object 110 and text frame 122. Sub-group 110 is further shown containing two members of its own, image frame 114 containing an image and text frame 118 representing a caption associated with image frame 114.

An object hierarchy with multiple levels may be formed by the objects of a page layout. For example, an object may contain one or more other objects (in such situations, the object containing one or more other objects may be called a "group object," "group," or "object group"). The group object containing one or more other objects is on one level, while the objects contained in the group object are on different levels than the group object. In an embodiment illustrated in FIG. 1, text frame 102 and group objects 104 and 106 are all on the same level of the object hierarchy in the page layout 100 displayed in the graphical user interface. Group object 104 also contains group object 108 and text frame 120 (group object 108 and text frame 120 may be considered member objects of group object 104). As a result, group object 108 and text frame 120 are both one level below the level associated with group object 104. Similarly, group object 106 also contains group object 110 and text frame 122 (group object 110 and text frame 122 may be considered member objects of group object 106). As a result, group object 110 and text frame 122 are both one level below the level associated with group object 106. In this embodiment, group objects 108 and 110 and text frames 120 and 122 were also on the same level. Group objects 108 and 110 also contain an image frames 112 and 114 containing images and text frames 116 and 118 representing a caption associated with the image frames 112 and 114. As a result, image frames 112 and 114 and text frames 116 and 118 may also be one level below the level associated with group objects 108 and 110. Furthermore, the images contained in image frames 112 and 114 may also be associated with a level below the level associated with image frames 112 and 114.

Figure 2:
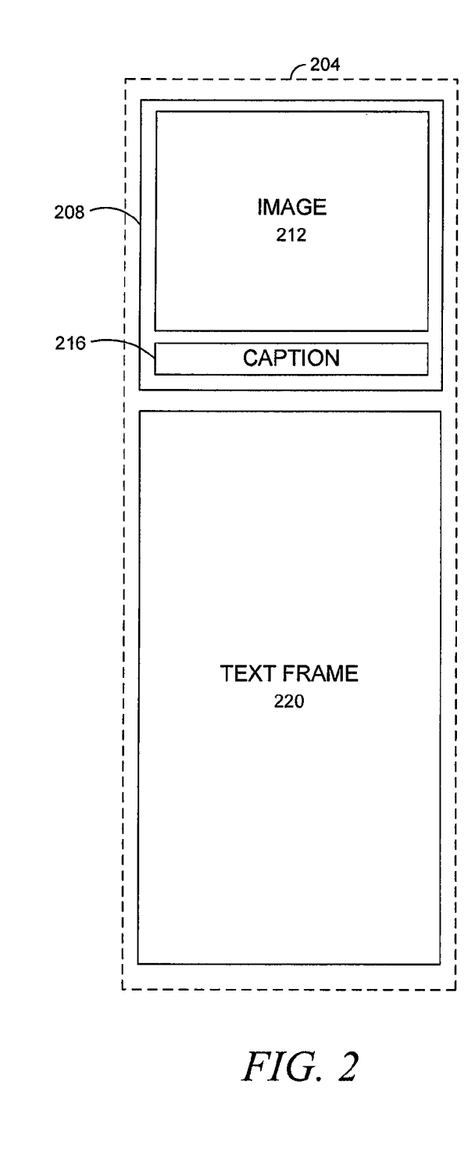
FIG. 2 is a block diagram illustrating a user interface displaying a selection of an object group within an example page layout, according to various embodiments.

FIG. 2 is a block diagram illustrating a user interface displaying a selection of an object group within an example page layout, according to various embodiments. In FIG. 2, group object 204 is selected. Group object 204 contains sub-group object 208 and text frame 220, where sub-group object 208 further contains image frame 212 and text frame 216. In order to select an object within object group 204, a user may have to use a command accessed via a graphical user interface element such as a tool palette, task bar, toolbar, menu command, a set of buttons, or shortcut keys. For example, a menu may include menu commands, such as, e.g., "NEXT OBJECT" and "PREVIOUS OBJECT" to select other objects within a group object, "NEXT OBJECT ABOVE" or "NEXT OBJECT BELOW" to select an object stacked above or below the object at the location of the object, and "SELECT CONTAINER" or "SELECT CONTENT" to select the group object containing the object or member object within the object. Alternatively, a user may be required to use a graphical user interface element to ungroup member objects in the group 204 before selecting the desired object within the group 204. Use of these commands requires a user to first find the command within the graphical user interface. This may involve finding the graphical user interface element that contains the command and/or navigating through menus and sub-menus to find the desired command. Often, the graphical user interface elements are located at the top or bottom of the user interface, or, in the case of a pop-out menu bar, located at an arbitrary location.

In more complicated page layouts with a large number of objects or objects nested within several object groups, these methods may be cumbersome and inefficient. For example, a user may be required to navigate one or more menus to select "SELECT CONTAINER" and "SELECT CONTENT" several times or ungroup several different group objects in order to select a desired object. In the case where a user ungroups multiple group objects in order to select a desired object, the user may need to regroup the objects after he or she is finished with the desired object in order to return the page layout to its previous state.

Figure 3:
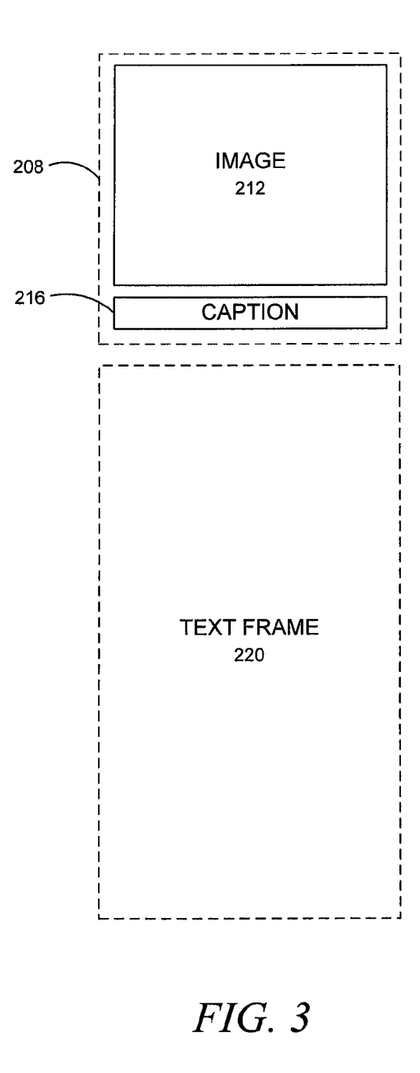
FIG. 3 is a block diagram illustrating a user interface displaying a selection of ungrouped objects within an example page layout, according to various embodiments.

FIG. 3 is a block diagram illustrating a user interface displaying a selection of ungrouped objects within an example page layout, according to various embodiments. In FIG. 3, group object 208 and text frame 220 correspond to the group object 204 (shown in FIG. 2). The group object 208 and the text frame 220 have been ungrouped such that group object 208 and text frame 220 are now selected as individual objects and are no longer contained in the group object 204. However, if a user wants to select an image frame 212 or a text frame 216, the user may need to ungroup the group object 208 again. As a result, even in a page layout as simple as the one illustrated in FIG. 1, in order to select and operate on an object within one or more object groups (for example, image frame 112 within group objects 108 and 104), multiple ungroup commands are needed. Furthermore, after operating on the object, multiple group commands may be required to return the page layout to its previous state.

According to some embodiments the current position of a cursor on a graphical user interface having an object hierarchy with different levels may be monitored. A user may select an object in a layout by moving a cursor to the object to be selected and initiating a cursor actuation signal. However, more than one object, each having at a different level of the object hierarchy, may be positioned at the cursor position where the user initiated the cursor actuation signal. When a cursor actuation signal is received, a level of the object hierarchy is selected based on the cursor position of the cursor and an object is selected based on the cursor position and the selected level of the object hierarchy. In one embodiment, an initial object, at an initial level of the object hierarchy, may be selected in response to receiving the cursor actuation signal. If the initially selected object is not the object desired by the user, the user can initiate another cursor actuation signal at the same location and an object at the same position and at a new higher level of the object hierarchy may be selected. This process of selecting objects at higher and higher levels of the object hierarchy in response to cursor actuation signals may be repeated until a user's desired object is selected.

Figure 4:
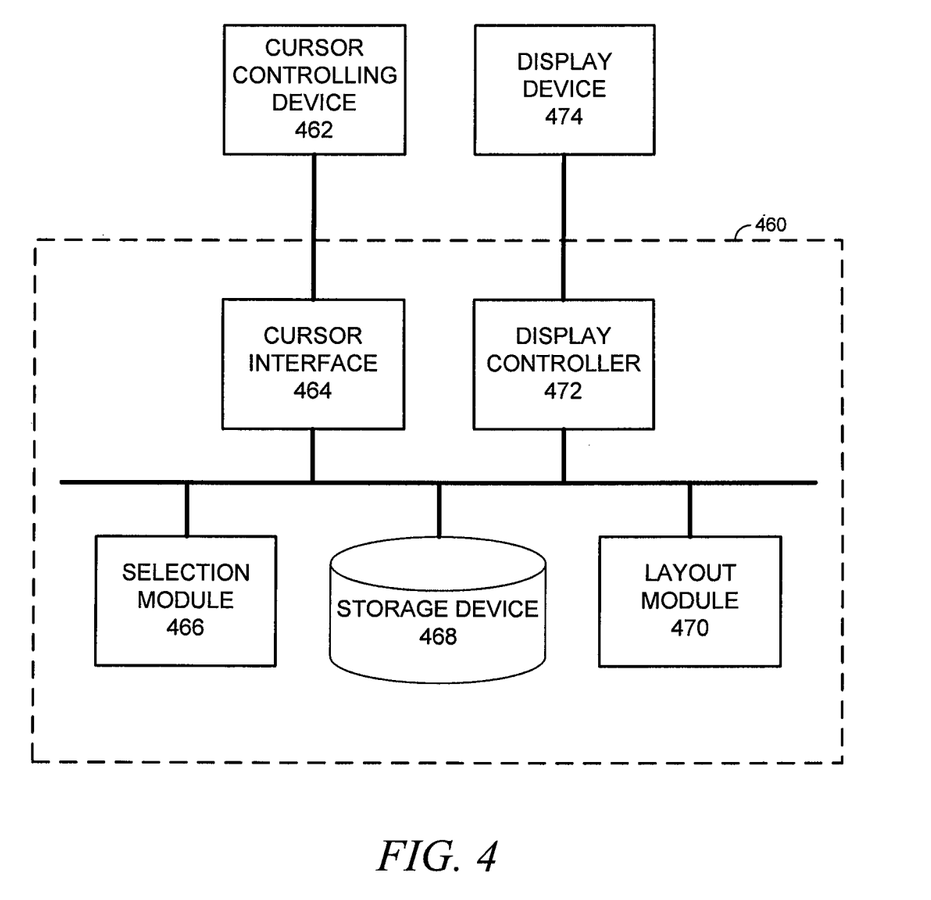
FIG. 4 is a block diagram of a system to select an object, according to various embodiments.

FIG. 4 is a block diagram of a system to select an object, according to various embodiments. The system 460 may include a cursor interface 464, a display controller 472, a selection module 466, a storage device 468, and a layout module 470. A storage device 468 such as a database or other memory device may be used to store page layouts. These page layouts may be accessed, edited, and displayed. The layout module 470 may access the page layout and enable a user to edit the page layout. In some embodiments, the layout module 470 may also be used to associate objects within the page layout with levels. For example, the layout module 470 may store an object with an associated level value or level reference data within a page layout. In another embodiment, the layout module 470 may maintain an object level table that stores references to objects in the page layout and their associated levels. In still another embodiment, objects within a page layout are stored in a tree data structure in which a child object is at a level higher than its parent object, and conversely, a parent object is lower than its child object. A display controller 472 may be used to display the page layout and the graphical user interface on a display device 474.

A cursor interface 464 may be configured to monitor a current position of a cursor on a graphical user interface. For example, the cursor interface 464 may receive input from a cursor controlling device 462 such as a mouse, touchpad, trackball, tablet and digital pen, touch screen, or any other device able to control a cursor on a graphical user interface. Using the cursor controlling device 462, a user may move a cursor around on a page layout displayed in a graphical user interface and over objects within the page layout. The layout module 470 and the cursor interface 464 may be used to determine the location or position of the cursor with respect to the page layout and the objects within the page layout. In one embodiment, the cursor may not be visible, for example, a touch-screen interface may not have a visible cursor, however, a cursor is still used to indicate a position on a touch-screen and reacts to user interaction with the touch-screen.

The cursor interface 464 may also be configured to receive a cursor actuation signal from a cursor controlling device 462. In one embodiment, the cursor actuation signal may be a "double-click" signal from a mouse or trackball. In other embodiments, the cursor actuation signal may be a "double-tap" signal from a touchpad or tablet and digital pen, or a multi-touch gesture. In still other embodiments, the cursor actuation signal may be another customized signal or selection signal. In response to the receiving the cursor actuation signal, the selection module 466 may select a level of the different levels within the object hierarchy. In some embodiments the level represents the level of the target object to be selected (also referred to as the "new level," "new hierarchy level," or "selected level"). After the level is selected, the selection module 466 may then select the target object.

Figure 5:
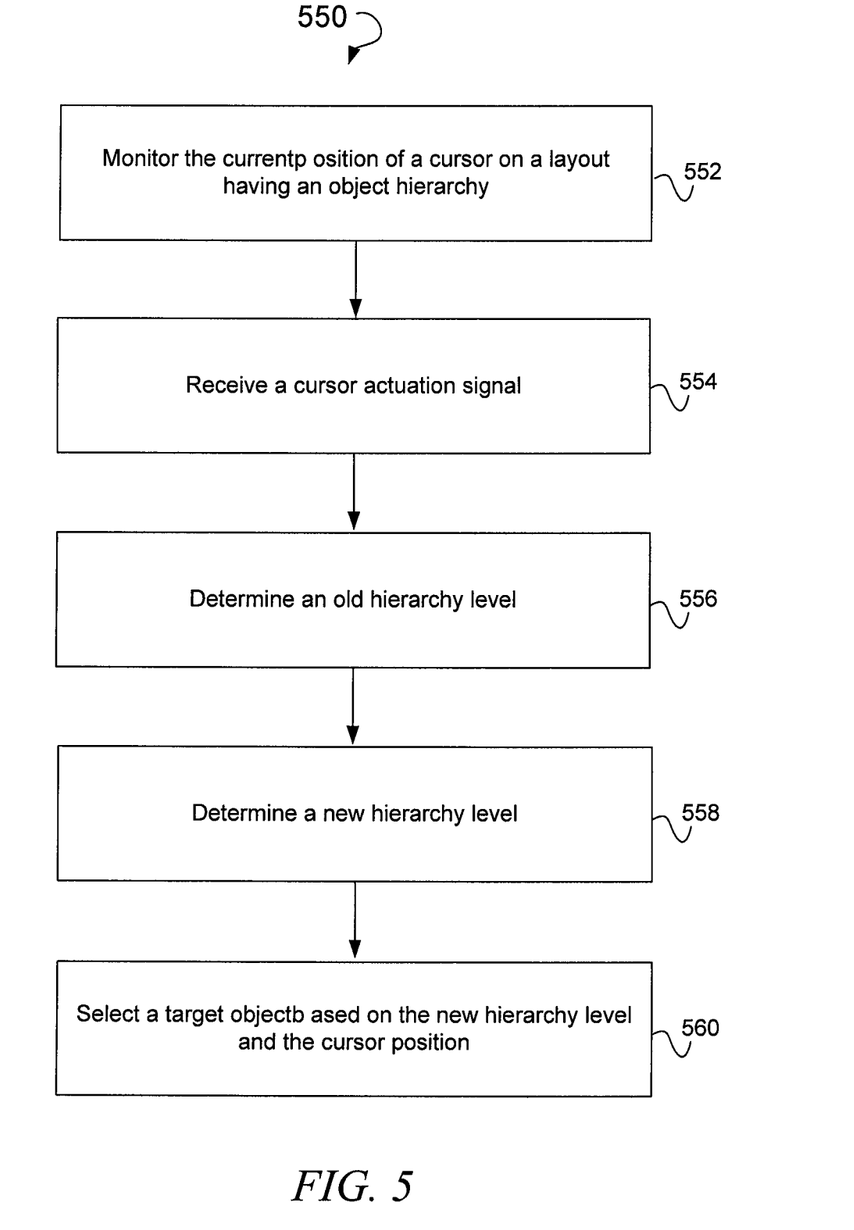
FIG. 5 is a flow diagram illustrating a method to select an object, in accordance with one example embodiment.

FIG. 5 is a flow diagram illustrating a method 550 to select an object, in accordance with one example embodiment. The method may be implemented by the system 460. At operation 552, a cursor interface 464 may be used to monitor a current position of a cursor on a page layout displayed in a graphical user interface. The page layout may include several objects that form an object hierarchy with different levels. Each object in the page layout may be associated with a level of the object hierarchy. At operation 554, the cursor interface 464 may receive a cursor actuation signal, for example, from a cursor controlling device 462 such as a mouse. In one embodiment the cursor interface 464 receives the actuation signal as a result of a user moving the cursor to a position in the layout or graphical user interface corresponding to a desired object and causing a cursor controlling device 462 such as a mouse to send a cursor actuation signal. In one embodiment, the user may "double-click" the mouse at the desired object.

At operation 556, the selection module 466 may be used to determine an old hierarchy level. The old hierarchy level may correspond to an initial level of the object hierarchy or, if another object had been previously selected, the level associated with the previously selected object. In one embodiment, the old hierarchy level may be determined in response to receiving the cursor actuation signal. In other embodiments, however, the old hierarchy level may be determined before the cursor actuation signal is received. In still another embodiment, the selection module 466 may maintain a record of one or more previously selected objects and old hierarchy levels.

At operation 558, a selection module 466 may be used to determine a new hierarchy level within the object hierarchy based on the cursor position at the time the cursor actuation signal is received. In one embodiment, the new hierarchy level may also be determined based on the old hierarchy level. In some embodiments the new hierarchy level represents the level of the target object to be selected. At operation 560, the selection module 466 may also be used to select a target object based on the new hierarchy level and the cursor position. Further embodiments and details will be discussed below.

Figure 6:
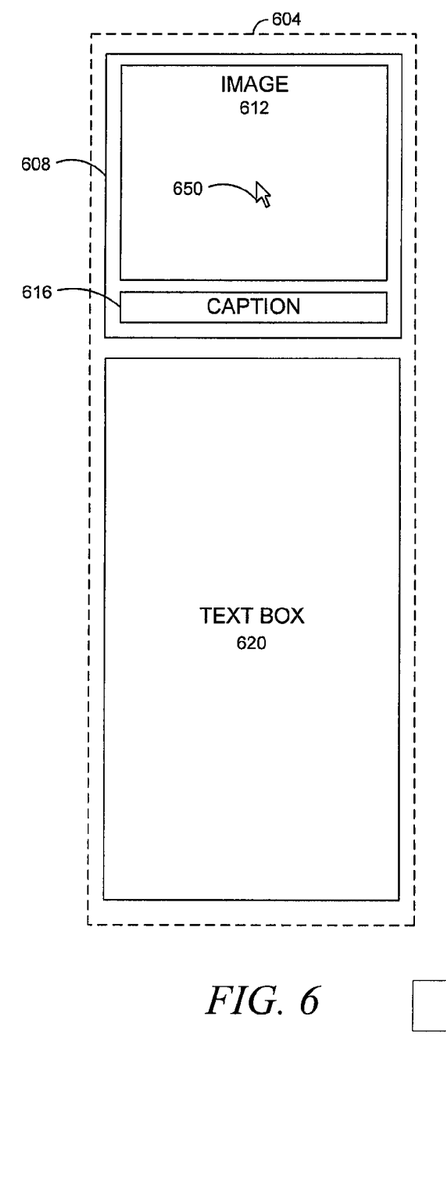
FIG. 6 is a block diagram illustrating a user interface displaying a selection of an object group within an example page layout, according to various embodiments.

FIG. 6 is a block diagram illustrating a user interface displaying a selection of an object group within an example page layout, according to various embodiments. In FIG. 6, group object 604 is shown as selected (see dotted lines). Group object 604 contains two members, sub-group object 608 and text frame 620, where sub-group object 608 contains two other members, image frame 612 and text frame 616. As a result, group object 604 may be on one level of the object hierarchy, sub-group object 608 and text frame 620 may be on another level of the object hierarchy, and image frame 612 and text frame 616 may be on still another level of the object hierarchy.

In various embodiments, the levels of the object hierarchy and levels associated with each object may be tracked and monitored. As discussed previously, each object may be stored with an associated level value or level reference data within a page layout, a table may be maintained to store references to objects in the page layout and their associated levels, or objects within a page layout are stored in a tree data structure. However, any number of other methods to keep track of the levels may be used and it is to be appreciated that the specification may use specific level ordering schemes, other methods of keeping track and monitoring the levels associated with objects in the object hierarchy may be implemented. For the sake of clarity and so as not to obscure claimed subject matter, the following discussion will focus on one specific embodiment in which a numbering system may be used. In this numbering system, the initial page layout is set to a default or initial number, for example the number "0," that corresponds to an initial level, for example "level 0." All objects placed on the page layout may be assigned a level in relation to its position in the object hierarchy. For example, a group object that does not belong in any other group object may be at level 1, where as objects within that group object may have a higher level number. In FIG. 6, for example, the group object 604 may be on "level 1" of the object hierarchy, sub-group object 608 and text frame 620 may be on "level 2" of the object hierarchy, and image frame 612 and text frame 616 may be on "level 3" of the object hierarchy. In one embodiment, the currently selected object and its associated level may also be tracked and updated as each new object is selected.

As previously discussed, a user may move the cursor using a cursor controlling device 462 to a desired object; in FIG. 6, this is shown by cursor 650 (or pointer). At this point the cursor 650 is at or inside currently selected group object 604, sub-group object 608, and image frame 612. While the cursor is at the desired object, the user may cause a cursor controlling device 462 to send a cursor actuation signal to a cursor interface 464. In response to receiving a cursor actuation signal, the selection module 466 may be used to select a new hierarchy level within the object hierarchy and, based on the new hierarchy level and the cursor position at the time the cursor actuation signal was received, select a target object. For example, when the system receives the cursor actuation signal, it may determine that the object the user desires is at a higher level in the object hierarchy than the level of the currently selected group object 604 based on the position of the cursor at the time of the cursor actuation signal being inside of the currently selected group object 604 and inside at least one other member object. In the embodiment shown in FIG. 6, the currently selected object, group object 604, is associated with a first level, or "level 1," of the object hierarchy, as a result, the selection module may determine that the new hierarchy level is the second level, or "level 2," of the object hierarchy. The selection module 466 may then select sub-group object 608 based on the current position of the cursor being at or on sub-group object 608 and sub-group object 608 being associated with the new hierarchy level, or "level 2," of the object hierarchy.

Figure 7:
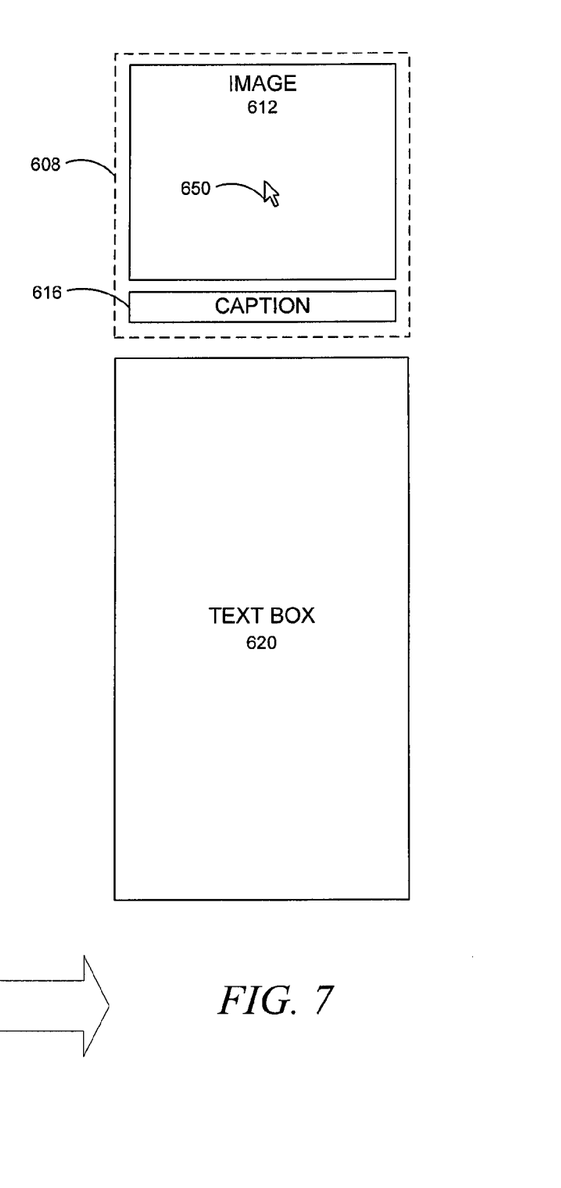
FIG. 7 is a block diagram illustrating a user interface displaying a selection of an object within an example page layout, according to various embodiments.

FIG. 7 shows the result of the selection module 466 selecting sub-group object 608 in accordance with the above embodiment. FIG. 7 is a block diagram illustrating a user interface displaying a selection of an object within an example page layout, according to various embodiments. In FIG. 7, sub-group object 608 is shown as selected (see dotted lines), where sub-group object 608 further contains members 612 and 616. Also shown is text frame 620 that remained unchanged and cursor 650 still at its current position.

Referring back to FIG. 6, in one embodiment, the selection module 466 may determine that the current position of the cursor 650 is at an inner area of the currently selected group object 604 at the time the cursor actuation signal is received. This may indicate a user's desire to select an object that inside the currently selected object or at a higher level than that of the currently selected object, group object 604. As a result, the selection module 466 may determine that the new hierarchy level is a level higher than the old hierarchy level associated with the currently selected object, group object 604 (in the embodiment shown in FIG. 6, this means the new hierarchy level is level 2).

In another embodiment, the selection module 466 may determine that the current position of the cursor is at an outer area of the currently selected object at the time the cursor actuation signal is received. This may indicate a user's desire to select an object that surrounding or outside the currently selected object or at a lower level than that of the currently selected object. As a result, the selection module 466 may determine that the new hierarchy level is a level down from the old hierarchy level associated with the currently selected object.

An inner or outer area of an object may be defined by any means. For example, an inner area may be defined by an area within a certain radius from the center of the object or an area at least a predefined distance away from any boundary of the object. Similarly, an outer area may be defined as the area at least a certain radius away from the center of an object or an area within a predefined distance away from a boundary of the object. In one embodiment, the inner and outer areas of the object are not displayed in a graphical user interface. However, in other embodiments, the inner and outer areas may be displayed to a user.

Figure 8:
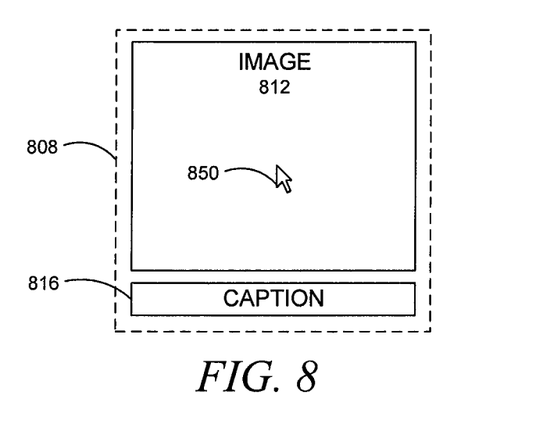
FIG. 8 is a block diagram illustrating a user interface displaying a selection of an object group within an example page layout, according to various embodiments.
Figure 9:
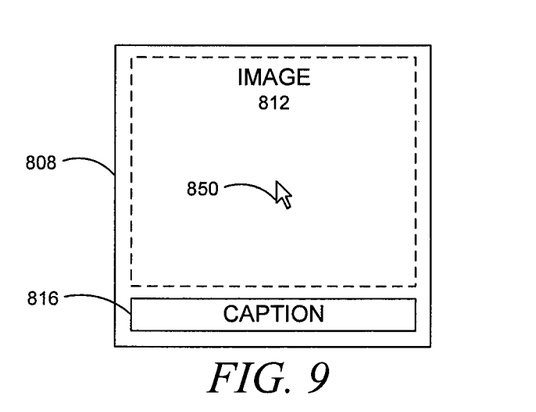
FIG. 9 is a block diagram illustrating a user interface displaying a selection of an object within an example page layout, according to various embodiments.

In one embodiment, a user may wish to select another object at an even higher level, for example image frame 612 in FIG. 7. FIG. 8 and FIG. 9 illustrate this situation. FIG. 8 is a block diagram illustrating a user interface displaying a selection of an object group within an example page layout, according to various embodiments. In FIG. 8, group object 808 is shown as selected (see dotted lines). Group object 808 contains two members, image frame 812 and text frame 816. In the embodiment illustrated in FIG. 8, the currently selected object, group object 808, is associated with a second level, or "level 2," of the object hierarchy. If a user wishes to select image frame 812, the user may move the cursor 850 using a cursor controlling device 462 to the image frame 812 and cause a cursor controlling device 462 to send a cursor actuation signal to a cursor interface 464.

In response to receiving a cursor actuation signal, the selection module 466 may be used to select a new hierarchy level and, based on the new hierarchy level and the current position of the cursor, select a target object. For example, when the system receives the cursor actuation signal, it may determine that the object the user desires is at an even higher level in the object hierarchy than the old hierarchy level associated with the currently selected object. As a result, the selection module 466 may set the new hierarchy level as a third level, or "level 3," of the object hierarchy. Since the current position of the cursor being at or on image frame 812 and image frame 812 is associated with a third level, or "level 3," of the object hierarchy, the selection module 466 may select image frame 812.

FIG. 9 shows the result of the selection module 466 selecting image frame 812 in accordance with the above embodiment. FIG. 9 is a block diagram illustrating a user interface displaying a selection of an object within an example page layout, according to various embodiments. In FIG. 9, image frame 812 is shown as selected (see dotted lines) and shown inside sub-group object 808 along with text frame 816. Also shown is cursor 850 still at its current position.

Figure 10:
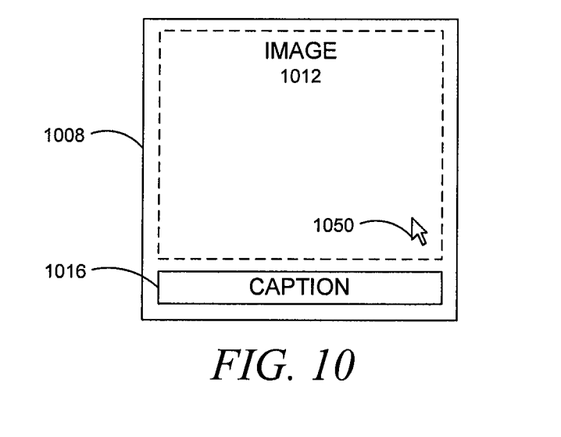
FIG. 10 is a block diagram illustrating a user interface displaying a selection of an object within an example page layout, according to various embodiments.
Figure 11:
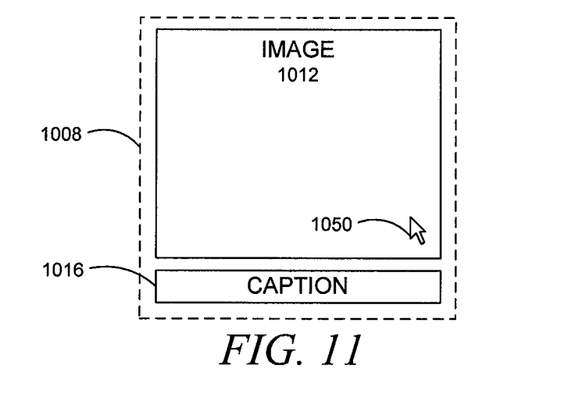
FIG. 11 is a block diagram illustrating a user interface displaying a selection of an object group within an example page layout, according to various embodiments.

As discussed earlier, in one embodiment, the selection module 466 may determine that the current position of the cursor is at an outer area of the currently selected object at the time the cursor actuation signal is received. This may indicate a user's desire to select an object that is surrounding or outside the currently selected object or at a lower level than the old hierarchy level associated with the currently selected object. As a result, the selection module 466 may determine that the new hierarchy level is a decrement of the old hierarchy level associated with the currently selected object. FIG. 10 and FIG. 11 illustrate this situation.

FIG. 10 is a block diagram illustrating a user interface displaying a selection of an object within an example page layout, according to various embodiments. In FIG. 10, image frame 1012 is shown as selected (see dotted lines) and shown inside group object 1008 along with text frame 1016. In the embodiment shown in FIG. 10, image frame 1012 and text frame 1016 are associated with a higher level than the level associated with group object 1008, for example, image frame 1012 and text frame 1016 may be associated with a third level, or "level 3," of the object hierarchy while group object 1008 may be associated with a second level, or "level 2," of the object hierarchy. A user may move the cursor 1050 to an outer area of the currently selected object, image frame 1012, and cause a cursor controlling device 462 to send a cursor actuation signal to a cursor interface 464.

In response to receiving a cursor actuation signal, the selection module 466 may be used to determine a new hierarchy level within the object hierarchy and, based on the new hierarchy level and the current position of the cursor, select a target object. For example, when the system receives the cursor actuation signal, it may determine that the object the user desires is at a lower level in the object hierarchy than the level of the currently selected object based on the cursor actuation signal being received when the current position of the cursor is at the outer area of the object. In the embodiment of FIG. 10, this may mean that the selection module 466 determines the new hierarchy level to be a second level, or "level 2," of the object hierarchy. Since the current position of the cursor is at or on sub-group 1008 and sub-group 1008 is associated with the second level, or "level 2," of the object hierarchy, the selection module 466 may select subgroup 1008. This result is shown in FIG. 11. FIG. 11 is a block diagram illustrating a user interface displaying a selection of an object group within an example page layout, according to various embodiments. In FIG. 11, sub-group 1008 is shown as selected (see dotted lines) and image frame 1012 and text frame 1016 are contained inside sub-group object 1008.

Figure 12:
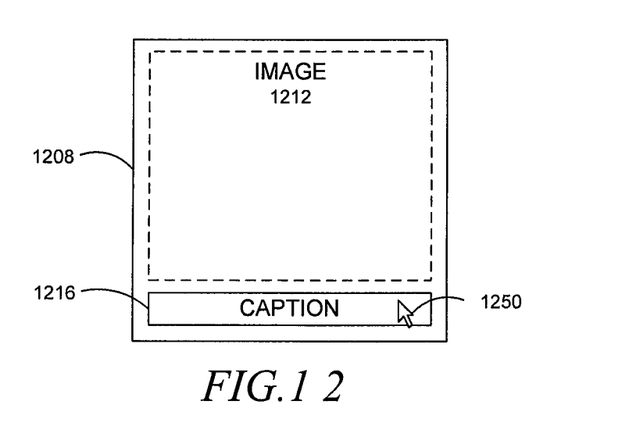
FIG. 12 is a block diagram illustrating a user interface displaying a selection of an object within an example page layout, according to various embodiments.
Figure 13:
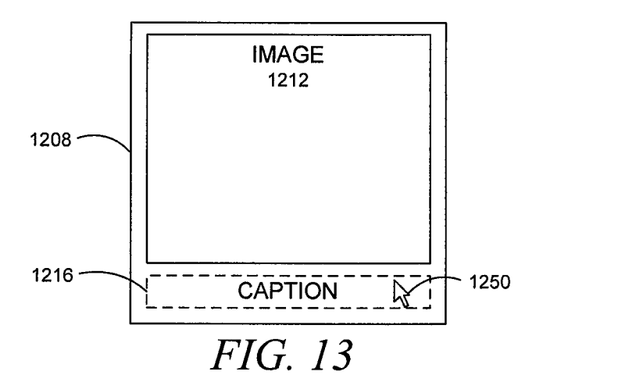
FIG. 13 is a block diagram illustrating a user interface displaying a selection of an object within an example page layout, according to various embodiments.

In another embodiment, the selection module 466 may determine that the current cursor position at the time the cursor actuation signal is received is outside the boundaries of the currently selected object and associated with another object. This may indicate a user's desire to select an object that is outside the currently selected object or associated with the same level than that of the currently selected object. As a result, the selection module 466 may determine that the new hierarchy level is equal to the old hierarchy level associated with the currently selected object. FIG. 12 and FIG. 13 illustrate this situation.

FIG. 12 is a block diagram illustrating a user interface displaying a selection of an object within an example page layout, according to various embodiments. In FIG. 12, image frame 1212 is shown as selected (see dotted lines) and shown inside sub-group object 1208 along with text frame 1216. In the embodiment shown in FIG. 12, image frame 1212 and text frame 1216 are associated with the same level while sub-group object 1208 is associated with a lower level than the levels associated with image frame 1212 and text frame 1216. A user may move the cursor 1250 to an area outside of the currently selected object, image frame 1212. More specifically, the user may move cursor 1250 to a position associated with another object, text frame 1216. The user may then cause a cursor controlling device 462 to send a cursor actuation signal to a cursor interface 464.

In response to receiving a cursor actuation signal, the selection module 466 may be used to determine a new hierarchy level within the object hierarchy and, based on the new hierarchy level and the current position of the cursor, select a target object. When the system receives the cursor actuation signal, it may determine, based on the current position of the cursor, that the new hierarchy level is the level associated with the currently selected object, image frame 1212. Since the current position of the cursor is at or on text frame 1216 and text frame 1216 is associated with the same level as image frame 1212, the selection module 466 may select text frame 1216. This result is shown in FIG. 13. FIG. 13 is a block diagram illustrating a user interface displaying a selection of an object within an example page layout, according to various embodiments. In FIG. 13, text frame 1216 is shown as selected (see dotted lines) and sub-group object 1208 is shown containing image frame 1212 and text frame 1216.

Figure 14:
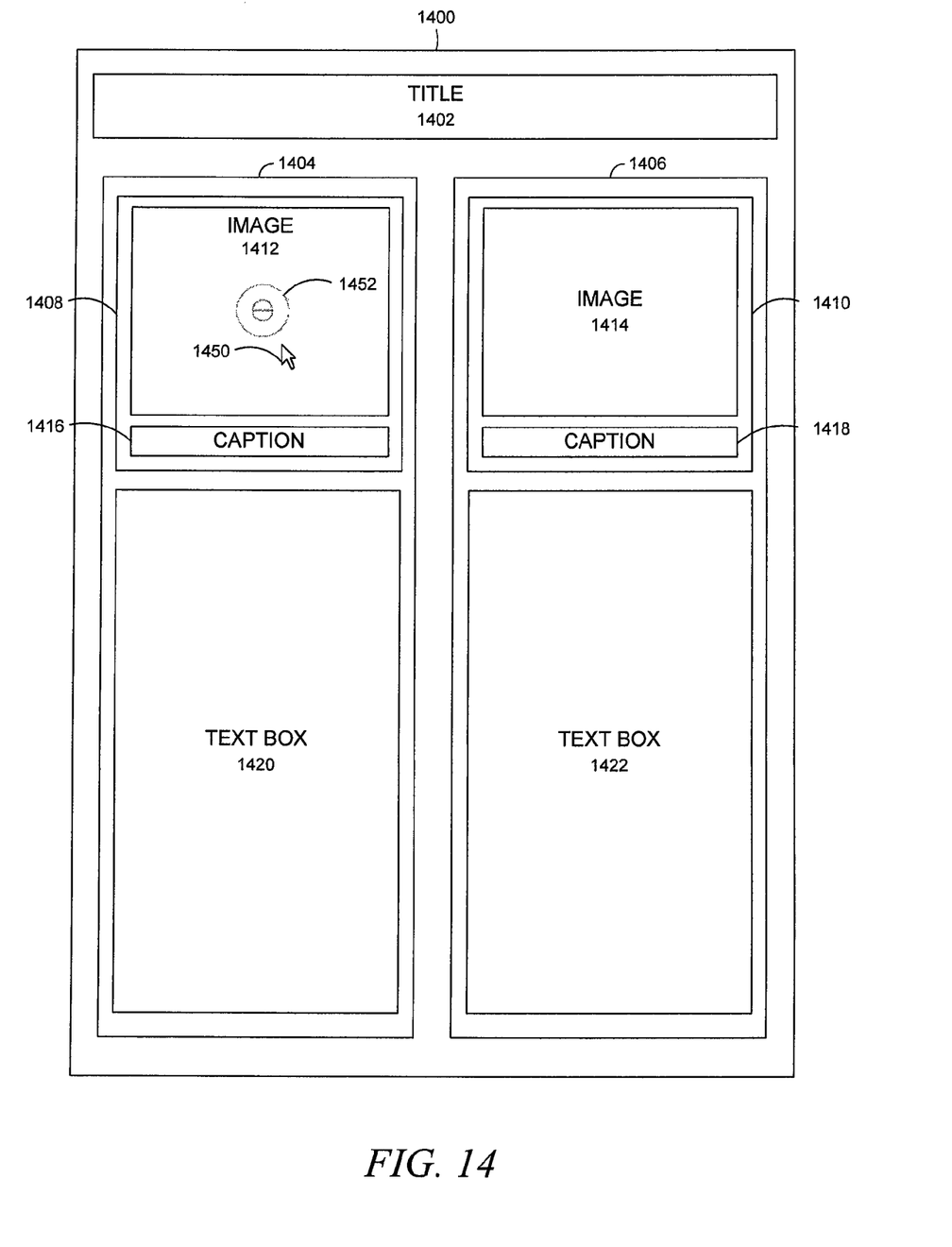
FIG. 14 is a block diagram illustrating a user interface displaying an example page layout, according to various embodiments.

In other embodiments, the system may enable a user to select a content object more directly. A content object is an object made of media content. Some examples of a content object are images, videos, audio files, etc. Content objects may even be a frame containing an image. In one embodiment, a layout module 470 may present a layout comprising a one or more group objects which may in turn comprise one or more content objects. The selection module 466 may determine that the current position of the cursor is over an object and the object is a content object. This may indicate a user's desire to select the content object. The display controller 472 may be used to display an indicator over the content object. The indicator may be an image over the center of the content object, a special cursor indicator, or some other special indicator. The user may then cause a cursor controlling device 462 to send an actuation of the indicator. As a result of receiving the actuation of the indicator, the selection module 466 may select the content object. In a related embodiment, the selection module 466 may also be used to determine that the selected level is the level associated with the content object. In another embodiment, an indicator is displayed when the cursor is over the content object for a predetermined period of time. FIG. 14 illustrates this situation.

FIG. 14 is a block diagram illustrating a user interface displaying an example page layout, according to various embodiments. In the embodiment of FIG. 14, page layout 1400 contains a text frame 1402 and group objects 1404 and 1406. Each group object 1404 and 1406 contains two members (sub-group objects 1408 and 1410 and text frames 1420 and 1422). Further, sub-groups 1408 and 1410 are also shown containing two members each (image frames 1412 and 1414 containing images and text frames 1416 and 1418 representing a caption associated with the image frames 1412 and 1414).

A user may position the cursor 1450 over a content object, such as an image, for a predetermined period of time. In response to determining that the cursor 1450 is over a content object for a predetermined period of time, the display controller may be used to display an indicator 1452 over the content object. The indicator 1452 may enable the user to select and access the content object more directly. For example, the user may cause a cursor controlling device 462 to send an actuation of the indicator. In various embodiments, this actuation of the indicator may be in the form of a single mouse click on the indicator, a double-click on the indicator, a tap on a touchpad or touch screen, or some other gesture that symbolizes the actuation of the indicator. As a result of receiving the actuation of the indicator, the selection module 466 may select the content object. For example, in the embodiment illustrated by FIG. 14, the image contained in image frame 1412 may be selected. In a related embodiment, the selection module 466 may also be used to determine that the selected level is the level associated with the content object. FIG. 14 illustrates this situation.

In some embodiments, a user does not need to search through the various commands found in various graphical user interface elements or navigate through menus and submenus to find a command to help select an object in a page layout. Some embodiments also enable a user to select an object quickly using a cursor actuation signals at the location of the object to be selected. Some embodiments also enable a user to select an object without having to ungroup group objects and regroup objects to return the page layout to its previous state.

Figure 15:
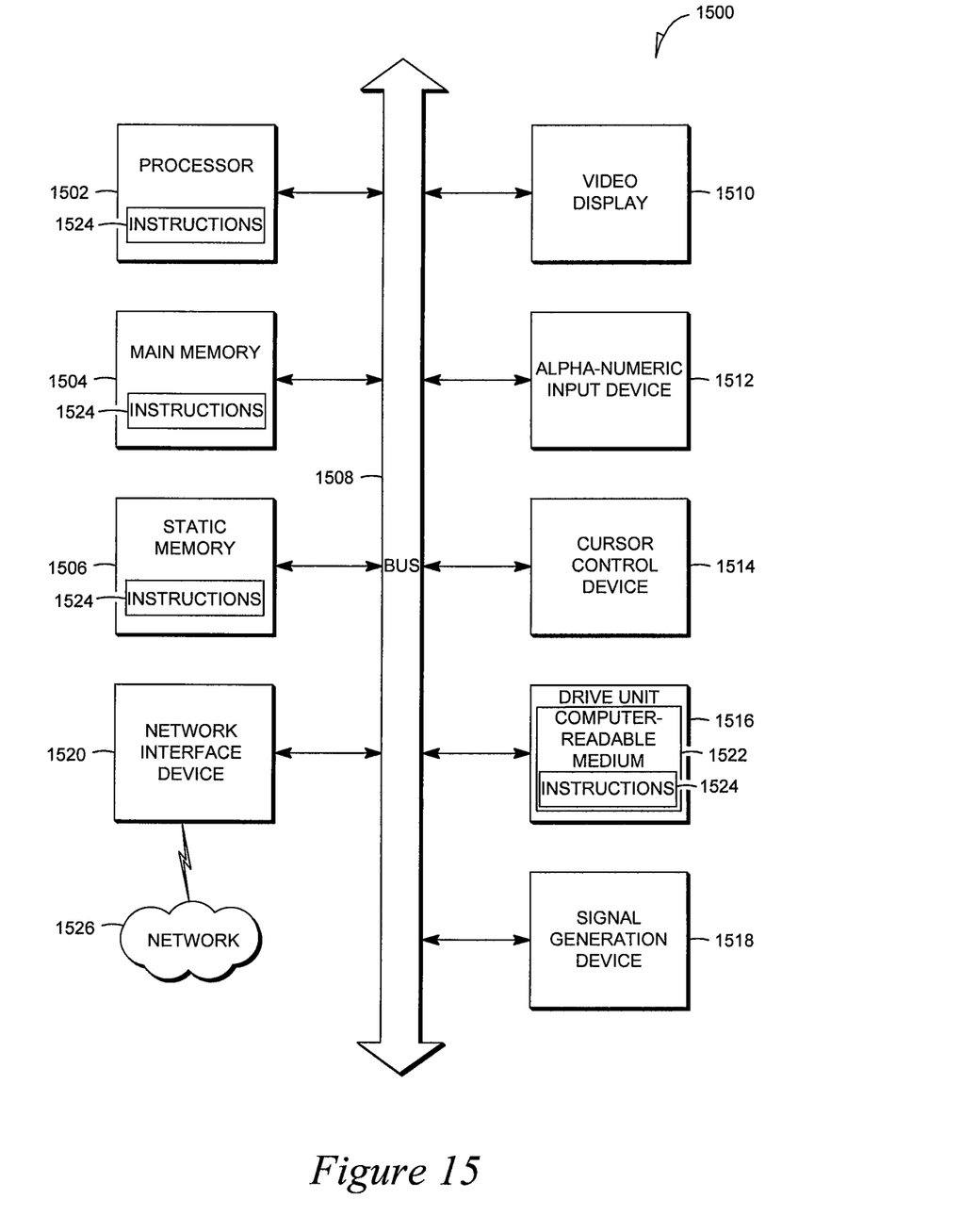
FIG. 15 is a block diagram of an article of manufacture, including a machine, according to various embodiments.

FIG. 15 is a block diagram of an article of manufacture, including a machine, according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU) a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 may also include an alphanumeric input device 1512 (e.g., a keyboard), a cursor control device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions (e.g., software 1524) embodying any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media. The software 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

In some instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Thus, methods and systems to select an object in a graphical user interface have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The modules discussed in this specification may be implemented in hardware, software, or a combination of hardware and software. Furthermore, the modules may or may not reside all on the same machine and may be arranged in configurations not shown in FIG. 4.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for selecting a desired object from a layout including a plurality of objects, wherein the plurality of objects belongs to an object hierarchy having different hierarchy levels, and wherein each object of the plurality of objects is associated with a respective hierarchy level in the object hierarchy, the method comprising:
   determining a currently selected object of the plurality of objects within the layout;
   receiving a cursor actuation signal, the cursor actuation signal associated with a first cursor position within the currently selected object;
   determining whether the first cursor position corresponds to an inner area within the currently selected object or an outer area within the currently selected object, wherein the outer area surrounds the inner area, the outer area extends inward from a boundary of the currently selected object, and the inner area comprises an area within a predetermined distance of a center point of the currently selected object;
   in response to determining the first cursor position corresponds to the inner area within the currently selected object and receiving the cursor actuation signal, selecting a child object of the currently selected object, wherein a position of the child object corresponds to the first cursor position, and wherein the child object is within the object hierarchy; and
   in response to determining the first cursor position corresponds to the outer area within the currently selected object and receiving the cursor actuation signal, selecting a parent object of the currently selected object, wherein the parent object is within the object hierarchy.

2. The method of claim 1, wherein the child object is a member of a first group object, the first group object associated with the respective hierarchy level of the currently selected object.

3. The method of claim 2, wherein the child object is a second group object in the layout, the second group object comprising one or more member objects.

4. The method of claim 1, wherein the parent object is a group object, the group object including one or more objects associated with the respective hierarchy level of the currently selected object.

5. The method of claim 1, wherein the cursor actuation signal is a mouse click.

6. A system comprising:
   a processor; and
   a computer storage medium having computer-executable instructions embodied thereon that, when executed by the processor, cause the processor to:
      provide a layout for display in a graphical user interface, the layout comprising a plurality of objects included in an object hierarchy having different hierarchy levels, wherein each object of the plurality of objects is associated with a respective hierarchy level in the object hierarchy,
      determine a currently selected object of the plurality of objects,
      receive a cursor actuation signal, the cursor actuation signal associated with a cursor position within the graphical user interface;
      determine whether the cursor position corresponds to an inner area within the currently selected object or an outer area within the currently selected object, wherein the outer area surrounds the inner area, the outer area extends inward from a boundary of the currently selected object, and the inner area comprises an area within a predetermined distance of a center point of the currently selected object,
      in response to determining the cursor position corresponds to the inner area within the currently selected object and receiving the cursor actuation signal, select a child object of the currently selected object, wherein a position of the child object corresponds to the cursor position, and wherein the child object is within the object hierarchy, and
      in response to determining the cursor position corresponds to the outer area within the currently selected object and receiving the cursor actuation signal, select a parent object of the currently selected object, wherein the parent object is within the object hierarchy.

7. The system of claim 6, wherein the child object is a member of a first group object, the first group object associated with the respective hierarchy level of the currently selected object.

8. The system of claim 7, wherein the child object is a second group object in the graphical user interface, the second group object comprising one or more member objects.

9. The system of claim 6, wherein the parent object is a group object, the group object including one or more objects associated with the respective hierarchy level of the currently selected object.

10. The system of claim 6, wherein the cursor actuation signal is a double-click signal.

11. A non-transitory machine-readable storage device comprising instructions that, when implemented by one or more machines, cause the one or more machines to perform operations comprising:
   providing a layout for display in a graphical user interface, the layout having a plurality of objects that form an object hierarchy with different levels, each object of the plurality of objects being associated with a respective hierarchy level of the different levels of the object hierarchy;
   determining a currently selected object of the plurality of objects;
   receiving a cursor actuation signal from a cursor controlling device;
   determining a position of a cursor associated with the cursor controlling device at a time the cursor actuation signal was received, the position of the cursor corresponding to a position within the currently selected object and within at least one of a child object of the currently selected object or a parent object of the currently selected object;
   determining whether the position of the cursor corresponds to an inner area within the currently selected object or an outer area within the currently selected object, wherein the outer area surrounds the inner area, the outer area extends inward from a boundary of the currently selected object, and the inner area comprises an area within a predetermined distance of a center point of the currently selected object;
   based on the position of the cursor corresponding to the inner area within the currently selected object, determining a target hierarchy level is higher than a current hierarchy level associated with the currently selected object, and based on the position of the cursor corresponding to a position within the child object of the currently selected object, wherein the child object is associated with the target hierarchy level, selecting the child object; and based on the position of the cursor corresponding to the outer area within the currently selected object, determining the target hierarchy level is lower than the current hierarchy level, and based on the position of the cursor corresponding to a position within the parent object of the currently selected object, wherein the parent object is associated with the target hierarchy level, selecting the parent object.

12. The method of claim 1, further comprising:

determining a second cursor position corresponds to a position of a content object comprising media content;

based on determining the second cursor position corresponds to the position of the content object, displaying an indicator at the position of the content object, wherein an actuation of the indicator enables selection of the content object;

receiving the actuation of the indicator; and selecting the content object in response to the actuation of the indicator.

13. The method of claim 12, wherein the content object is at least one of a video file or an audio file.

* * * * *